(12) United States Patent
Dupe et al.

(10) Patent No.: US 12,716,814 B2
(45) Date of Patent: Aug. 25, 2026

(54) ELECTRONIC DEVICE FOR A MEASURING RAKE FACILITATING DATA LOADING

(71) Applicants: Airbus SAS, Blagnac (FR); Airbus Operations SAS, Toulouse (FR)

(72) Inventors: Nicolas Dupe, Toulouse (FR); Nicolas Jean, Toulouse (FR); Maxime Keller, Toulouse (FR); Cyrille Dajean, Toulouse (FR); Christian Meloni, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 362 days.

(21) Appl. No.: 18/442,200

(22) Filed: Feb. 15, 2024

(65) Prior Publication Data

US 2024/0280438 A1 Aug. 22, 2024

(30) Foreign Application Priority Data

Feb. 17, 2023 (FR) .................................. FR2301498

(51) Int. Cl.
*G01M 15/14* (2006.01)
*B64D 45/00* (2006.01)
(Continued)

(52) U.S. Cl.
CPC ............. *G01M 15/14* (2013.01); *B64D 45/00* (2013.01); *B64F 5/60* (2017.01); *F01D 17/08* (2013.01);
(Continued)

(58) Field of Classification Search
CPC ...... G01M 15/14; G01M 9/065; B64D 45/00; B64D 5/60; F05D 2230/60;
(Continued)

(56) References Cited

U.S. PATENT DOCUMENTS

| | | | | |
|---|---|---|---|---|
| 2018/0283960 | A1* | 10/2018 | Giordan ................ | G01M 15/14 |
| 2019/0323909 | A1* | 10/2019 | Burgan ................ | G01M 15/02 |
| 2023/0366783 | A1 | 11/2023 | D'Almeida et al. | |

FOREIGN PATENT DOCUMENTS

| | | | |
|---|---|---|---|
| DE | 3438172 | A1 | 4/1986 |
| DE | 202010012601 | U1 | 1/2011 |

(Continued)

OTHER PUBLICATIONS

French Search Report and Written Opinion for corresponding French Patent Application No. 2301498 dated Sep. 4, 2023.

*Primary Examiner* — Peter J Macchiarolo
*Assistant Examiner* — John M Royston
(74) *Attorney, Agent, or Firm* — Greer, Burns & Crain, Ltd.

(57) ABSTRACT

The electronic device includes an acquisition board including at least one pressure sensor and extending over a length of a sleeve of the measuring rake, a processing unit detachably electrically connected to the acquisition board and detachably fixed to the sleeve, a loading/charging unit configured to be electrically connected to the processing unit and to recharge a power supply module of the processing unit when the processing unit is electrically disconnected from the acquisition board; the processing unit including a storage module configured to store the data; the loading/charging unit allowing data to be loaded into a user device. It is thus possible to remove the processing unit in order to load the data without having to completely dismantle the measuring rack.

13 Claims, 7 Drawing Sheets

(51) Int. Cl.

| | |
|---|---|
| ***B64F 5/60*** | (2017.01) |
| ***F01D 17/08*** | (2006.01) |
| ***F02K 1/72*** | (2006.01) |
| ***F02K 1/76*** | (2006.01) |
| ***G01D 9/00*** | (2006.01) |
| ***G01L 15/00*** | (2006.01) |
| ***G01L 19/00*** | (2006.01) |
| ***G01L 19/08*** | (2006.01) |
| ***G01L 19/14*** | (2006.01) |
| ***G01L 23/24*** | (2006.01) |
| ***G01L 23/26*** | (2006.01) |
| ***G01M 9/06*** | (2006.01) |

(52) U.S. Cl.

CPC ................ *F02K 1/72* (2013.01); *F02K 1/763* (2013.01); *F05D 2230/60* (2013.01); *F05D 2230/72* (2013.01); *F05D 2260/83* (2013.01); *F05D 2270/301* (2013.01); *G01D 9/005* (2013.01); *G01L 15/00* (2013.01); *G01L 19/0046* (2013.01); *G01L 19/0061* (2013.01); *G01L 19/0084* (2013.01); *G01L 19/083* (2013.01); *G01L 19/147* (2013.01); *G01L 23/24* (2013.01); *G01L 23/26* (2013.01); *G01M 9/065* (2013.01)

(58) Field of Classification Search

CPC ............. F05D 2230/72; F05D 2260/83; F05D 2270/301; F02K 1/68; F02K 1/72; F02K 1/763; G01D 9/005; F01D 17/08; G01L 19/0084; G01L 19/083; G01L 15/00; G01L 19/0046; G01L 19/0061; G01L 19/147; G01L 23/24; G01L 23/26

USPC ....................................................... 73/112.01

See application file for complete search history.

(56) References Cited

FOREIGN PATENT DOCUMENTS

| | | | |
|---|---|---|---|
| FR | 3090102 | A1 | 6/2020 |
| FR | 3117213 | A1 | 6/2022 |

* cited by examiner 7
6
1
21
C1
C2
8
B
A
23
80

21
1001
1001
C2
29a
A
1001
1001

ELECTRONIC DEVICE FOR A MEASURING RAKE FACILITATING DATA LOADING

CROSS-REFERENCES TO RELATED APPLICATIONS

This application claims the benefit of the French patent application No. 2301498 filed on Feb. 17, 2023, the entire disclosures of which are incorporated herein by way of reference.

FIELD OF THE INVENTION

The present invention relates to an electronic device for a measuring rake that facilitates data loading.

BACKGROUND OF THE INVENTION

During certain design or maintenance phases of an aircraft, the engines of said aircraft, notably turbojet engines, must be tested. These tests involve taking measurements, on the ground and/or in flight, at various points on the engine to be tested. These measurements involve instrumentation of the engine, in particular inside the secondary duct. To this end, measuring tools are known that are designed to be installed in an engine to be tested, notably to measure pressures, as described in document FR 3090102.

These measuring tools require cables to transmit data representing the measured pressure to one or more user devices. The cables are generally fixed to the walls of the engine or nacelle using adhesive tape. However, the tests are carried out in extreme conditions that can cause damage to the adhesive tapes. For example, said adhesive tapes can come unstuck. Furthermore, the cables very often can be severed after these adhesive tapes have come unstuck.

Therefore, the current measuring tools are not fully satisfactory.

SUMMARY OF THE INVENTION

The aim of the present invention is to overcome the disadvantages of the measuring tools of the prior art. To this end, it relates to an electronic device for a measuring rake, the measuring rake comprising a sleeve designed to be fixed to a connecting rod disposed across a duct of an aircraft engine.

According to the invention, the electronic device comprises:

- an acquisition board comprising at least one pressure sensor, the acquisition board being configured to at least partly extend over a length of the sleeve, the one or more pressure sensors being able to generate data representing pressure measurements;
- a processing unit detachably electrically connected to the acquisition board, the processing unit being configured to be detachably fixed to the sleeve;
- a charging unit configured to be electrically connected to the processing unit when the processing unit is electrically disconnected from the acquisition board;

the processing unit comprising:

- a first communication module configured to receive the data generated by the one or more pressure sensors when the processing unit is electrically connected to the acquisition board;
- a storage module configured to store the data received by the first communication module;
- a second communication module configured to transmit the data stored in the storage module to the charging unit when the charging unit is electrically connected to the processing unit;

the charging unit comprising:

- a third communication module configured to receive the data transmitted by the second communication module when the charging unit is electrically connected to the processing unit;
- a fourth communication module configured to transmit the data received by the third communication module to a user device.

Thus, by virtue of the fact that the processing unit is detachably electrically connected to the acquisition board and is detachably fixed to one end of the sleeve, it is possible to detach the processing unit from the sleeve. It is then possible to load the data stored in the storage module without having to dismantle the sleeve containing the acquisition board. It is then no longer necessary to use cables fixed with adhesive tape in order to load the data.

According to an advantageous embodiment, the processing unit comprises a fifth communication module configured to remotely communicate with a remote control device, the fifth communication module being configured to receive at least one control signal likely to be sent by the remote control device, the one or more control signals representing at least one command to the one or more pressure sensors to start acquiring at least one pressure measurement and/or at least one command to the one or more pressure sensors to stop acquiring the one or more pressure measurements.

In addition, the processing unit further comprises a synchronization module configured to synchronize the data generated by the one or more pressure sensors before said data is stored in the storage module.

Moreover, the processing unit comprises at least one power supply module configured to supply power to the processing unit.

In a preferred embodiment, the processing unit comprises two parts assembled and detachably fixed together at one end of the sleeve on either side of the sleeve, each of the two parts comprising an electronic board, the electronic board of each of the two parts accommodating the modules of the processing unit.

Furthermore, the first communication module, the storage module, the second communication module, the fifth communication module and the synchronization module are distributed between the two electronic boards.

In addition, the power supply module comprises two batteries, each of the two batteries being connected to a respective electronic board, each of the two batteries being configured to supply power to the one or more modules of a respective electronic board.

In addition, the processing unit comprises a battery management module configured to monitor the electric charge level of each of the batteries and to manage the supply of power to the one or more modules of the electronic boards as a function of the electric charge level of each of the batteries.

Moreover, each of the two parts of the processing unit comprises a half-shell, each half-shell respectively housing an electronic board, each of the two half-shells being configured to be assembled to the other half-shell in order to form a shell.

Advantageously, the loading/charging unit is configured to electrically recharge the power supply module when the loading/charging unit is electrically connected to the processing unit.

The invention also relates to a measuring rake designed to be fixed to a connecting rod disposed across a duct of an aircraft engine.

According to the invention, the measuring rake comprises an electronic device as specified above.

The invention relates to an aircraft engine, said engine comprising a duct and at least one movable reversing door, said reversing door comprising at least one connecting rod fixed in an articulated manner between the reversing door and a powerplant, said connecting rod being configured to allow the reversing door to be brought into a retracted position, in which it is not across the duct, and into a deployed position, in which it is across the duct.

According to the invention, the engine comprises at least one measuring rake as specified above, arranged on at least one connecting rod of the engine, the one or more connecting rods each being housed in the housing of at least one sleeve of a measuring rake.

The invention also relates to an aircraft comprising at least one engine as specified above.

BRIEF DESCRIPTION OF THE DRAWINGS

The attached figures will demonstrate how the invention can be implemented. In these figures, identical references designate similar elements.

DETAILED DESCRIPTION OF THE PREFERRED EMBODIMENTS

Figure 1:
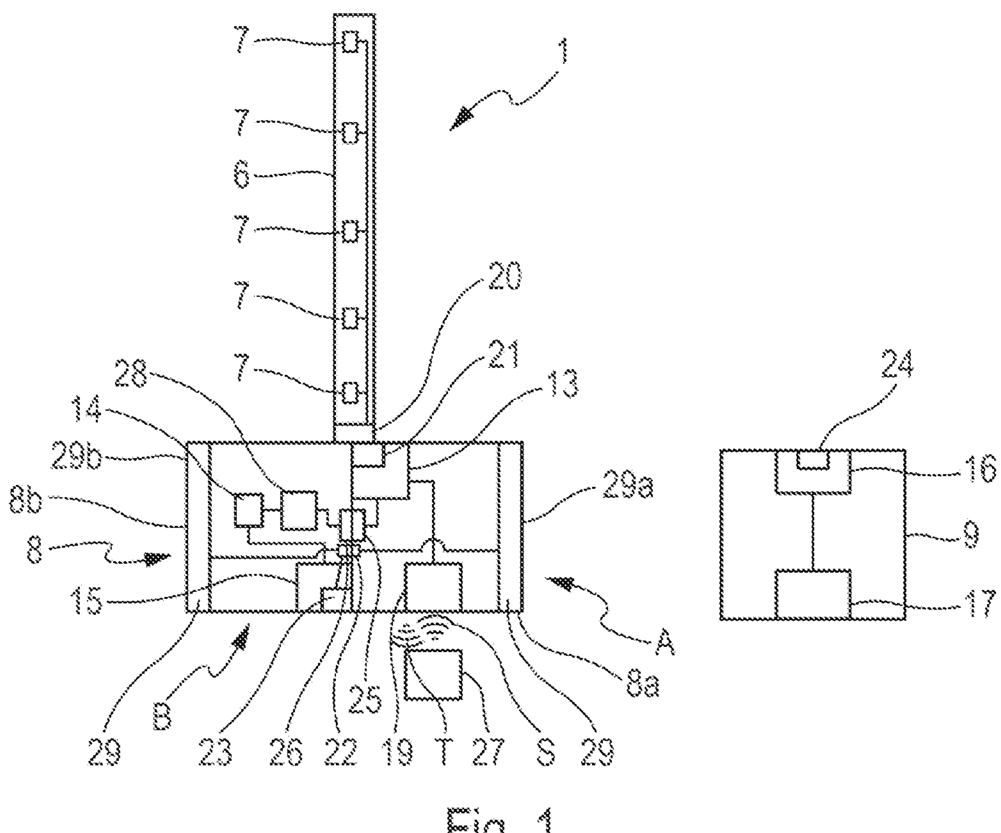
FIG. 1 schematically shows the electronic device, in which the processing unit is connected to the acquisition board.
Figure 2:
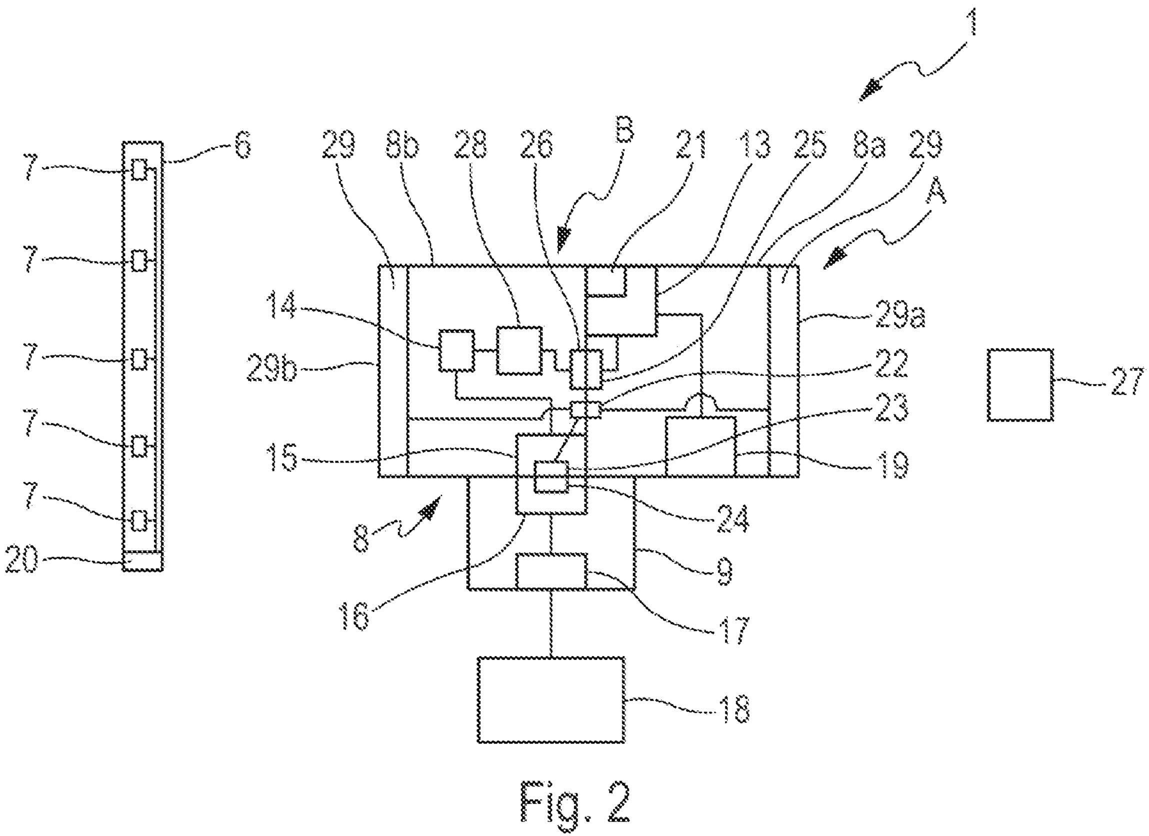
FIG. 2 schematically shows the electronic device, in which the processing unit is connected to the loading/charging unit.

The electronic device 1 for a measuring rake (hereafter called "electronic device 1") is schematically shown in FIG. 1 and FIG. 2.

The measuring (pressure) rake 2 comprises a sleeve 82 designed to be detachably fixed to a connecting rod 4 disposed across a duct 5 (commonly called "secondary duct") of an engine 3 of an aircraft AC. The measuring rake 2 is used to measure the pressure inside the engine 3, in particular inside the duct 5 of a twin-stream turbojet engine 3.

A "detachable" element is understood to mean an element that is fixed to an assembly so that it can be disassembled from the assembly and subsequently reassembled on demand.

Figure 3:
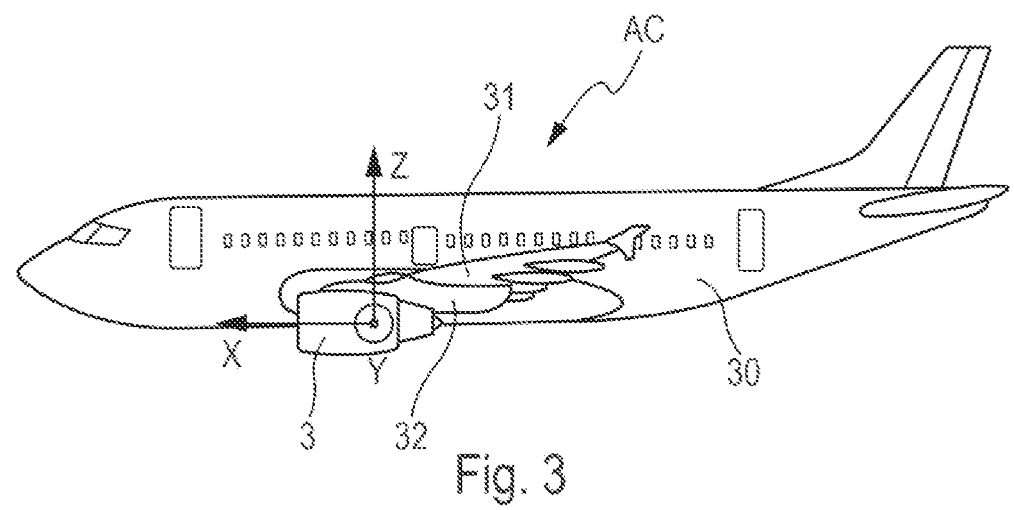
FIG. 3 shows an aircraft comprising an engine having a measuring rake with the electronic device.

FIG. 3 shows an aircraft AC comprising a fuselage 30 with a wing 31 fixed on each side. The wing 31 supports an engine 3 and a mast 32 that secures the engine 3 under the wing 31. Throughout the following description, the engine 3 more specifically corresponds to a twin-stream turbojet engine 3 comprising a duct 5, but it can correspond to any engine comprising a duct in which the pressure of an air stream must be measured.

Throughout the following description, X refers to the longitudinal axis of the engine 3 that is parallel to the longitudinal axis of the aircraft AC and is positively oriented toward the front of the aircraft AC. Y refers to the transverse axis that is horizontal when the aircraft AC is on the ground. Z refers to the vertical axis when the aircraft AC is on the ground. The three axes X, Y and Z are orthogonal to each other.

Figure 4:
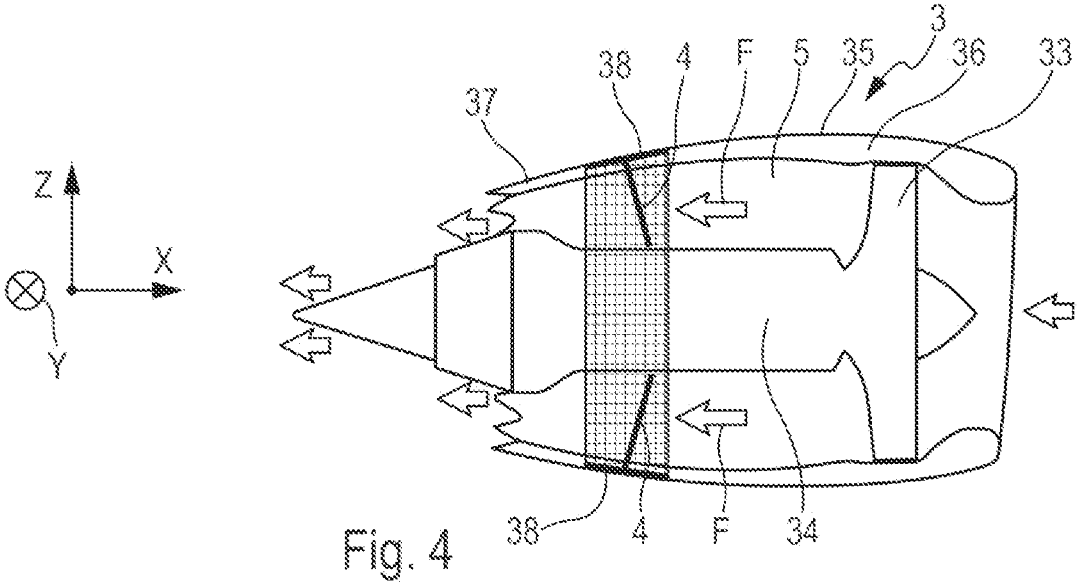
FIG. 4 schematically shows a twin-stream turbojet engine comprising a reversing door in a retracted position.
Figure 5:
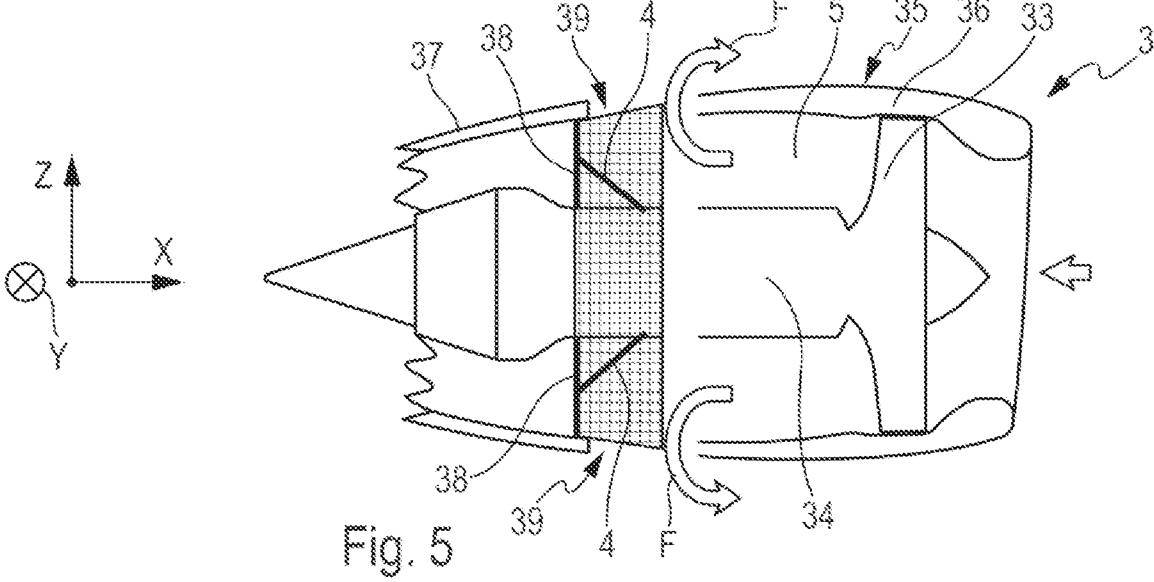
FIG. 5 schematically shows a twin-stream turbojet engine comprising a reversing door in a deployed position.

FIG. 4 and FIG. 5 show an example of a twin-stream turbojet engine 3. The twin-stream turbojet engine 3 comprises a fan 33, a powerplant 34 forming a core and a nacelle 35 disposed around the powerplant 34. The powerplant 34 is located downstream of the fan 33. A duct 5 is defined between the powerplant 34 and the nacelle 35. The air entering through the blower 33 is divided into a primary stream that passes through the powerplant 34 and a secondary stream that passes through the duct 5. The nacelle 35 comprises, around the fan 33, a fixed fan casing 36 and movable cowls 37, which are behind the fan casing 36 and each of which is translationally movable in a translation direction that is generally parallel to the longitudinal axis X of the twin-stream turbojet engine 3.

Each movable cowl 37 is translationally movable relative to the powerplant 34 between an advanced position (FIG. 4) and a retracted position (FIG. 5). In the advanced position (FIG. 4), the movable cowls 37 are adjacent to the rear of the fan casing 36. In the retracted position, the movable cowls 37 are moved back relative to the fan casing 36 and away from the fan casing 36 in order to open a window 39 between the duct 5 and the outside of the nacelle 35. The window 39 is defined at the front by the fan housing 36 and at the rear by the movable cowls 37.

Each movable cowl 37 is moved by any suitable means, such as slides, jacks, etc.

The twin-stream turbojet engine 3 also comprises a thrust reversing system that comprises at least one reversing door 38.

Each reversing door 38 can be moved between a retracted position (FIG. 4) and a deployed position (FIG. 5). In the retracted position (FIG. 4), the reversing door 38 is not across the duct 5 and therefore does not obstruct the passage of the secondary air stream F in the duct 5. In the deployed position (FIG. 5), the reversing door 38 is across the duct 5 so as to divert the air stream F toward the window 39 that opens between the duct 5 and the outside of the nacelle 35.

For each reversing door 38, the reversing system also comprises a connecting rod 4 that moves the reversing door 38 from the retracted position to the extended position when the movable cowl 37 transitions from the advanced position to the retracted position. The connecting rod 4 is fixed in an articulated manner between the reversing door 38 and the powerplant 34.

In the retracted position (FIG. 4), each connecting rod 4 is across the duct 5. In the deployed position (FIG. 5), each connecting rod 4 can be practically pressed against the powerplant 34.

Figure 6:
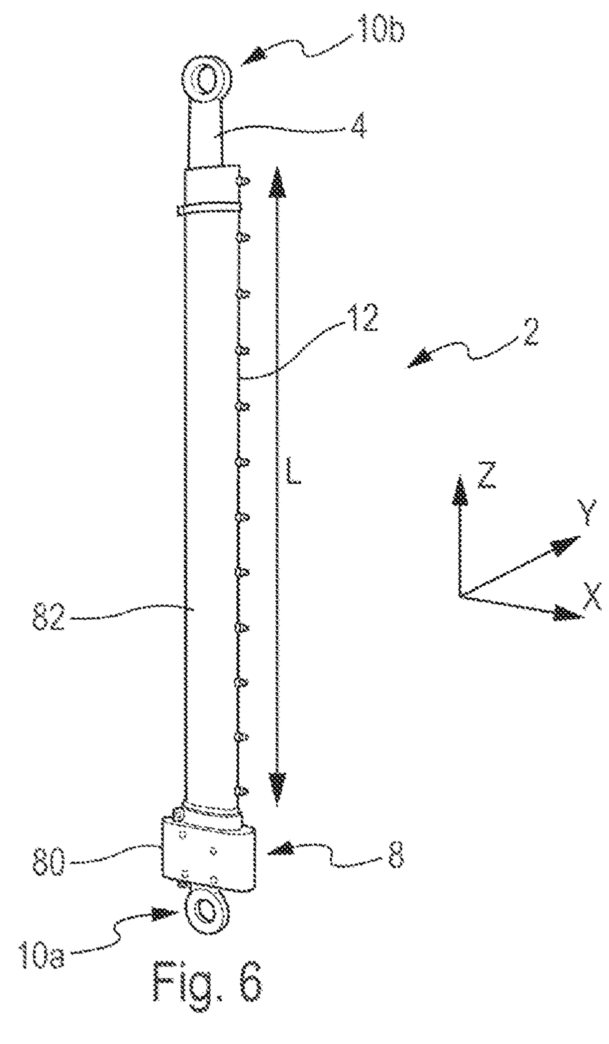
FIG. 6 shows a measuring rake mounted on a connecting rod.
Figure 7:
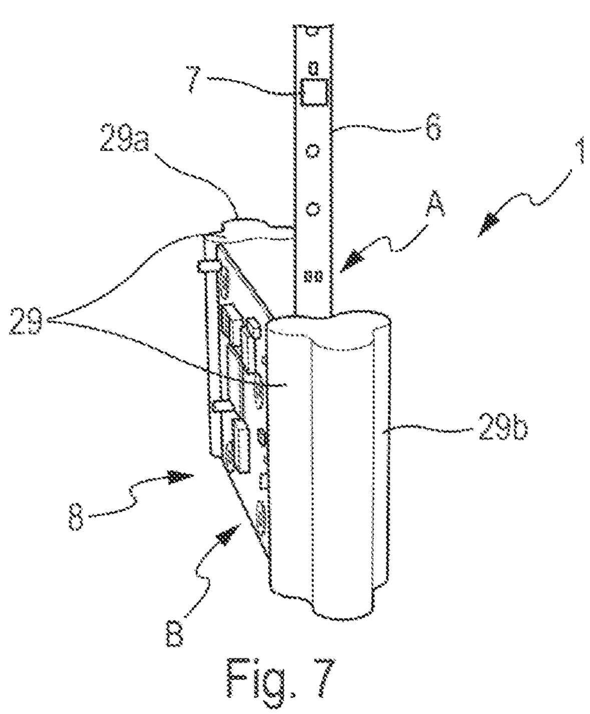
FIG. 7 shows a perspective view of the processing unit connected to the acquisition board.

FIG. 6 shows the connecting rod 4 with an articulation point at each end 10*a*, 10*b* and covered by a measuring rake 2. The measuring rake 2 is more specifically designed to measure pressures when the reversing door 38 is in the retracted position (FIG. 4).

The connecting rod 4 has an aerodynamic section, around which the air flows from the duct 5 along the X axis.

The measuring rake 2 comprises a sleeve 82. The sleeve can comprise two side walls 821 and 822, between which a housing 823 is defined that accommodates the connecting rod 4. The housing 823 is connected to the outside of the sleeve 82 via an opening 824 that extends over a length L of the sleeve 82 between the two side walls 821, 822. The connecting rod 4 is configured to be inserted into the housing 823 through the opening 824.

The electronic device 1 comprises an acquisition board 6, a processing unit 8 and a loading/charging unit 9 (FIG. 1 and FIG. 2).

The acquisition board 6 comprises at least one pressure sensor 7. The acquisition board 6 is, for example, mounted on the leading edge of the sleeve 82. The acquisition board 6 is configured to at least partly extend along the length L of the sleeve 82. The length L of the sleeve 82 (along which the acquisition board 6 is configured to extend) is configured to be substantially parallel to the connecting rod 4 on which the measuring rake 2 is likely to be mounted. The one or more pressure sensors 7 is/are configured to be directed toward the front of the aircraft AC along the X axis. The one or more pressure sensors 7 is/are thus able to generate data representing pressure measurements.

The one or more pressure sensors 7 can correspond to a MEMS (Micro-ElectroMechanical System) type sensor.

By way of a non-limiting example, the measuring rake 2 comprises a leading edge 12 extending along the entire length L of the sleeve 82 (FIG. 6).

Figure 13:
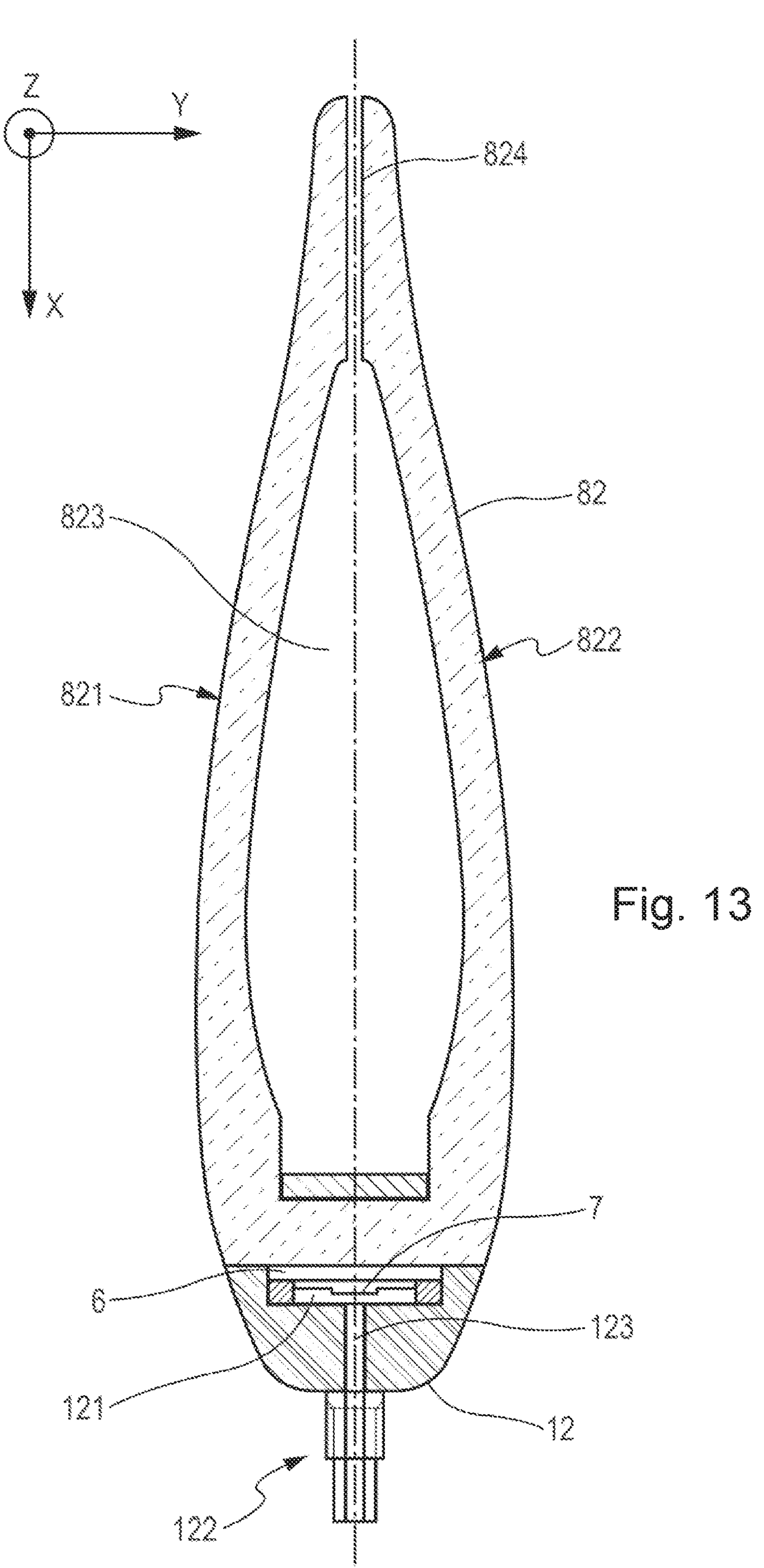
FIG. 13 shows a cross-section of the measuring rake.

The leading edge 12 can correspond to a part attached to the sleeve 82. The leading edge 12 can also form an integral part of the sleeve 82. The leading edge 12 has a plurality of cavities 121 distributed along a length L of the leading edge 12 (FIG. 13). Each of the cavities 121 is hermetically isolated from another cavity 121. For each of the cavities 121, the measuring rake 2 has an air intake 122 that forms a fluid passage 123 between the cavity 121 and the duct 5. Each air intake 122 of the leading edge 12 exclusively connects with a cavity 121. In each of the cavities 121, the measuring rake 2 comprises at least one pressure sensor 7.

The processing unit 8 is detachably electrically connected to the acquisition board 6. The processing unit 8 is configured to be detachably fixed to the sleeve 82 during pressure measurements, as shown in FIG. 1. Preferably, the processing unit 8 is fixed to one end of the sleeve 82. The end can correspond to that which is closest to the end 10*a* of the connecting rod that is articulated with the engine 3.

The loading/charging unit 9 is configured to be electrically connected to the processing unit 8 when the processing unit 8 is electrically disconnected from the acquisition board 6 and to load the data generated by the one or more pressure sensors 7, as shown in FIG. 2.

The processing unit 8 comprises at least a first communication module 13, a storage module 14 and a second communication module 15.

The first communication module 13 is configured to receive the data generated by the one or more pressure sensors 7 when the processing unit 8 is electrically connected to the acquisition board 6.

The first communication module 13 and the acquisition board can each comprise a connector 20 and 21, respectively, configured to be detachably electrically connected together so that the processing unit can be detachably electrically connected to the acquisition board 6.

The storage module 14 is configured to store the data received by the first communication module 13.

The second communication module 15 is configured to transmit the data stored in the storage module 14 to the loading/charging unit 9 when the loading/charging unit 9 is electrically connected to the processing unit 8.

The loading/charging unit 9 comprises a third communication module 16 and a fourth communication module 17.

The third communication module 16 is configured to receive the data transmitted by the second communication module 15 when the loading/charging unit 9 is electrically connected to the processing unit 8.

The fourth communication module 17 is configured to transmit the data received by the third communication module 16 to a user device 18.

By way of a non-limiting example, the user device 18 can correspond to a display device.

The second communication module 15 and the third communication module 16 can each comprise a connector 23 and 24, respectively, configured so as to be detachably electrically connected together so that the second communication module 15 can be electrically connected to the third communication module 16 when the loading/charging unit 9 is electrically connected to the processing unit 8.

Furthermore, the processing unit 8 can comprise a fifth communication module 19 configured to remotely communicate with a remote control device 27. The fifth communication module 19 is configured to receive at least one control signal S likely to be sent by the remote control device 27. The one or more control signals S represent at least one command to the one or more pressure sensors 7 to start acquiring at least one pressure measurement and/or at least one command to the one or more pressure sensors 7 to stop acquiring the one or more pressure measurements. The one or more commands can be transmitted to the one or more pressure sensors 7 via the first communication module 13.

The command signal S likely to be sent by the remote control device 27 to the fifth communication module 19 can also correspond to an acquisition frequency configuration signal intended for the one or more pressure sensors 7. The acquisition frequency configuration signal can command the one or more sensors 7 to acquire the one or more pressure measurements over a given acquisition frequency.

For example, the fifth communication module 19 remotely communicates with the remote control device 27 using a remote communication protocol, such as a "Bluetooth" type protocol.

According to one embodiment, the electronic device 1 can comprise said remote control device 27.

According to another embodiment, the remote control device 27 can correspond to a smartphone running an application.

Thus, it is possible to remotely control the start and end of the pressure measurements by the measuring rake 2.

The fifth communication module 19 can also send a signal T to the remote control device 27 representing pressure measurements measured by the one or more pressure sensors 7. The remote control device 27 also can be configured to check the pressure measurements measured by the one or more pressure sensors 7.

The processing unit 8 can further comprise a synchronization module 28 configured to synchronize the data generated by the one or more pressure sensors 7 before said data is stored in the storage module 14. The synchronization module 28 can synchronize the data generated by each of the pressure sensors 7 with each other.

The control signal S likely to be sent by the remote control device 27 to the fifth communication module 19 can also correspond to a synchronization signal intended for the synchronization module 28. The synchronization signal can synchronize the synchronization module 28 to an external time reference or to an internal time of the remote control device 27.

The processing unit 8 can comprise at least one power supply module 29 configured to supply power to the processing unit 8.

The fifth communication module 19 can also send a signal T to the remote control device 27 representing the electric charge level of the power supply module 29. The remote control device 27 also can be configured to display the electric charge level of the power supply module 29.

In a preferred embodiment, the processing unit 8 comprises two parts A and B. The two parts A and B are assembled and detachably fixed together at the end 10*a* of the sleeve 82 on either side of the sleeve 82. Each of the two parts A and B comprises an electronic board 8*a*, 8*b*.

In this preferred embodiment, the electronic board 8*a*, 8*b* of each of the two parts A, B receives the modules of the processing unit 8; in other words, the processing unit 8 comprises two electronic boards 8*a* and 8*b* comprising the modules 13, 14, 15, 19 and 28 of the processing unit 8.

The electronic board 8*a* and the electronic board 8*b* can each further comprise a connector 25 and 26. The connectors 25 and 26 are configured to be detachably electrically connected to each other so that the two electronic boards 8*a* and 8*b* can be detachably connected to each other when the two parts A and B are assembled and can be disconnected when the two parts A and B are disassembled.

In addition, in the preferred embodiment, the first communication module 13, the storage module 14, the second communication module 15, the fifth communication module 19 and the synchronization module 28 are distributed between the two electronic boards 8*a*, 8*b*.

Preferably, the storage module 14 and the second communication module 15 are included in the same electronic board 8*a* or 8*b*.

FIG. 1 and FIG. 2 show an example of the distribution of the modules 13, 14, 15, 19 and 28. In this example, the first communication module 13 and the fifth communication module 19 are included in the electronic board 8*a*. The second communication module 15, the storage module 14 and the synchronization module 28 are included in the electronic board 8*b*.

In the preferred embodiment, the power supply module 29 comprises two batteries 29*a* and 29*b*. Each of the two batteries 29*a* and 29*b* is connected to a respective electronic board 8*a*, 8*b*. Each of the two batteries 29*a* and 29*b* is configured to power the one or more modules 13, 14, 15, 19 and 28 of a respective electronic board 8*a*, 8*b*.

Advantageously, the loading/charging unit 9 is configured to electrically recharge the power supply module 29, notably the batteries 29*a* and 29*b*, when the loading/charging unit 9 is electrically connected to the processing unit 8. Each of the batteries 29*a* and 29*b* can be electrically recharged by the loading/charging unit 9 when the connectors 23 and 24 are electrically connected. The loading/charging unit 9 is therefore configured to electrically recharge the batteries 29*a* and 29*b*. The loading/charging unit 9 can be mains powered.

The processing unit 8 can comprise a battery management module 22. The battery management module 22 is configured to monitor the electric charge level of each of the batteries 29*a*, 29*b* and to manage the power supply to the one or more modules of the electronic boards 8*a*, 8*b* as a function of the electric charge level of each of the batteries 29*a*, 29*b*. For example, it can be configured to switch the power supply of the one or more modules 13, 14, 15, 19 and 28 to the battery 29*a* or 29*b* that still has a level of electric charge providing it with the most autonomy. Furthermore, it can be configured to stop a supply of power from the batteries 29*a*, 29*b* if these fall below a capacity threshold in order to avoid a deep discharge that may make it impossible to recharge the batteries 29*a* and 29*b*. The capacity threshold can be configured, for example, by a user. As shown in FIG. 1 and FIG. 2, the battery management module 22 can be distributed over the two electronic boards 8*a* and 8*b* in order to be able to monitor the electric charge level of each of the batteries 29*a*, 29*b* when the two electronic boards are disconnected from each other. However, the battery management module 22 can be included on a single electronic board 8*a*, 8*b*.

The fifth communication module 19 can also send a signal T to the remote control device 27 representing the electric charge level of each of the batteries 29*a*, 29*b* of the power supply module 29. The charge level of each of the batteries 29*a*, 29*b* can be provided by the battery management module 22. The remote control device 27 also can be configured to display, for example, on a screen, the electric charge level of each of the batteries 29*a*, 29*b*.

The fifth communication module 19 can also send a signal T to the remote control device 27 representing the operating mode level of the one or more modules 13, 14, 15, 19 and 28 of the electronic boards 8*a*, 8*b*. The remote control device 27 also can be configured to display, for example, on a screen, the operating mode of each of these modules 13, 14, 15, 19 and 28. An operating mode can correspond to a module standby mode, a module (control) pending mode or a pressure measurement acquisition mode (for the sensors 7, for example).

Dividing the processing unit 8 into two electronic boards 8*a* and 8*b* provides the necessary space for integrating all the modules 13, 14, 15, 19, 28 and 29 into the processing unit 8 and other modules. The distribution can also allow the grounds to be distributed on either side of the connecting rod 4 when the measuring rake 2 is mounted on the connecting rod 4.

Figures 8, 9:
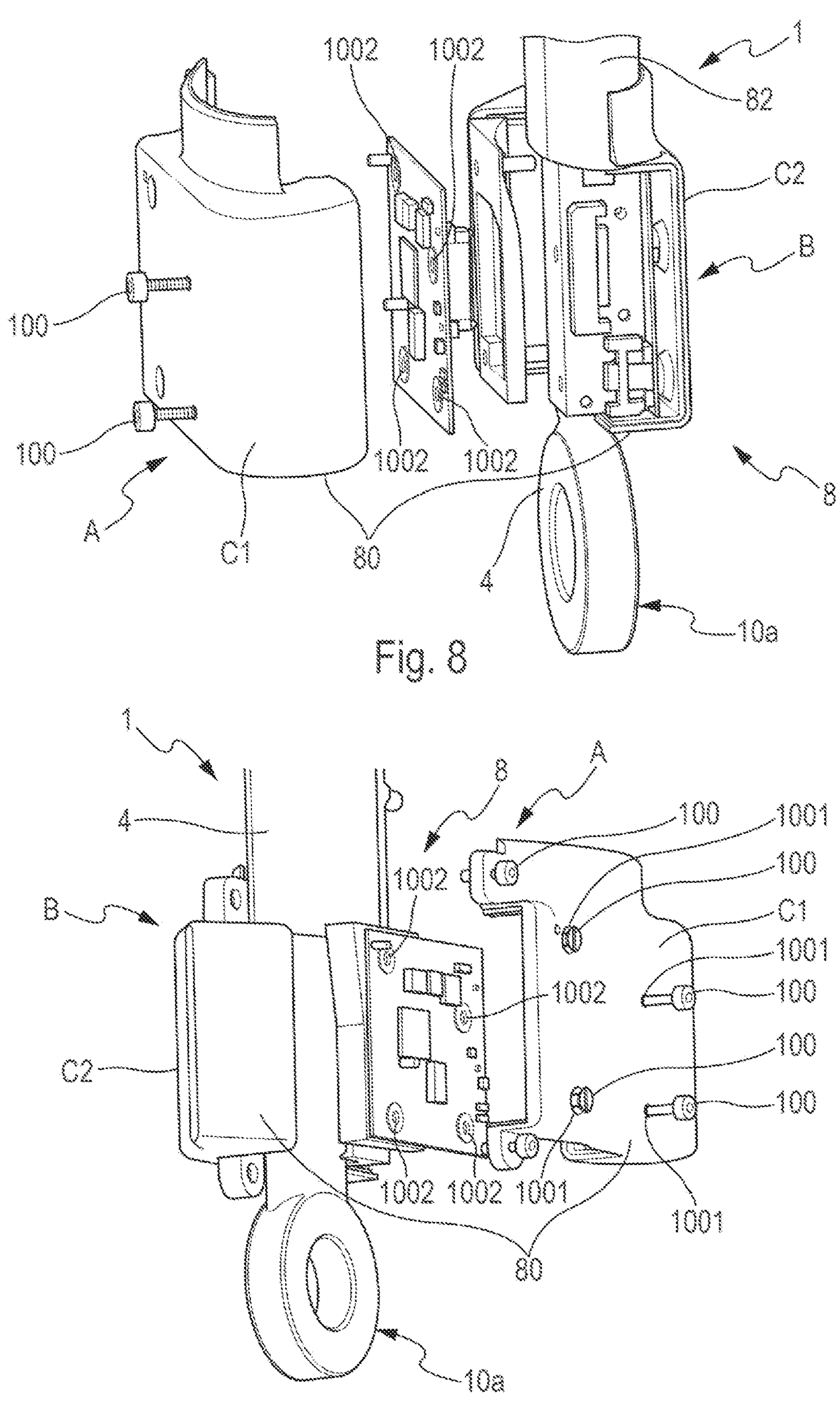
FIG. 8 shows a first perspective and exploded view of the processing unit fixed to one end of the sleeve of the measuring rake.
FIG. 9 shows a second perspective and exploded view of the processing unit fixed to one end of the sleeve of the measuring rake.
Figures 10, 11:
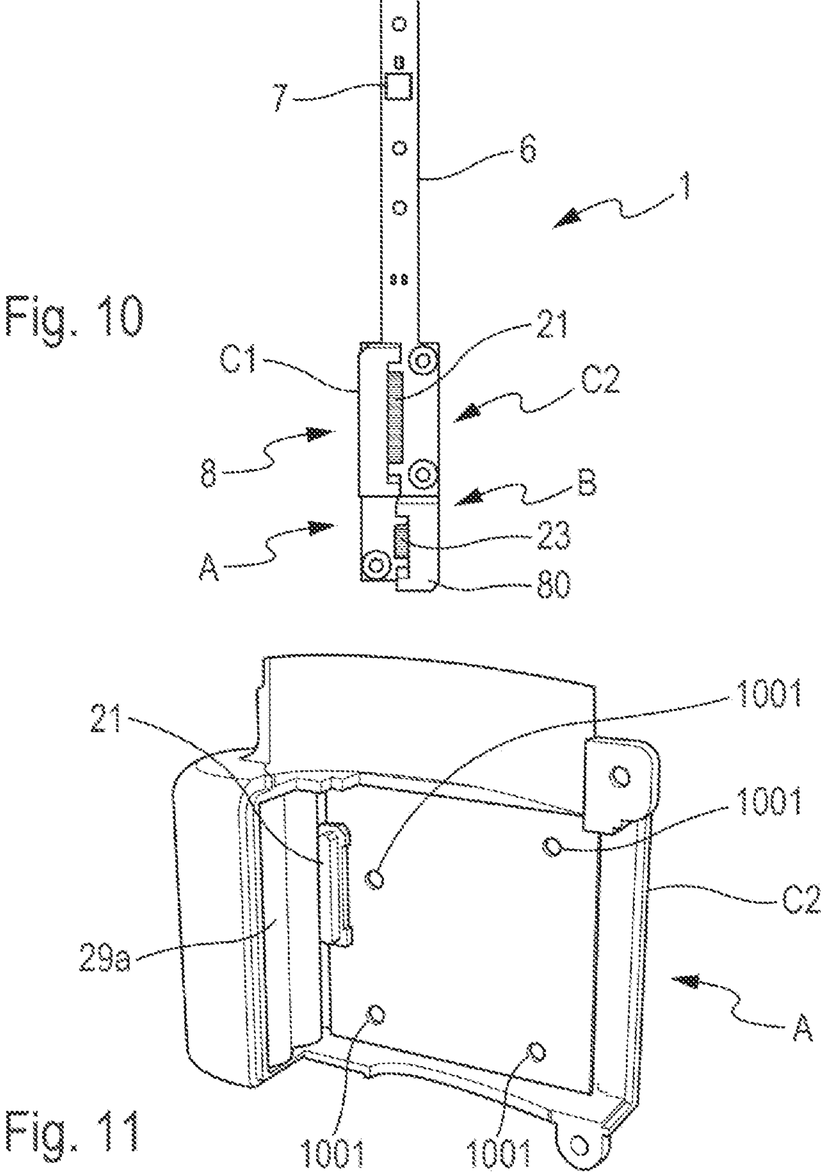
FIG. 10 shows a longitudinal cross-section of the electronic device.
FIG. 11 shows a perspective view of a first half-shell of the processing unit.
Figure 12:
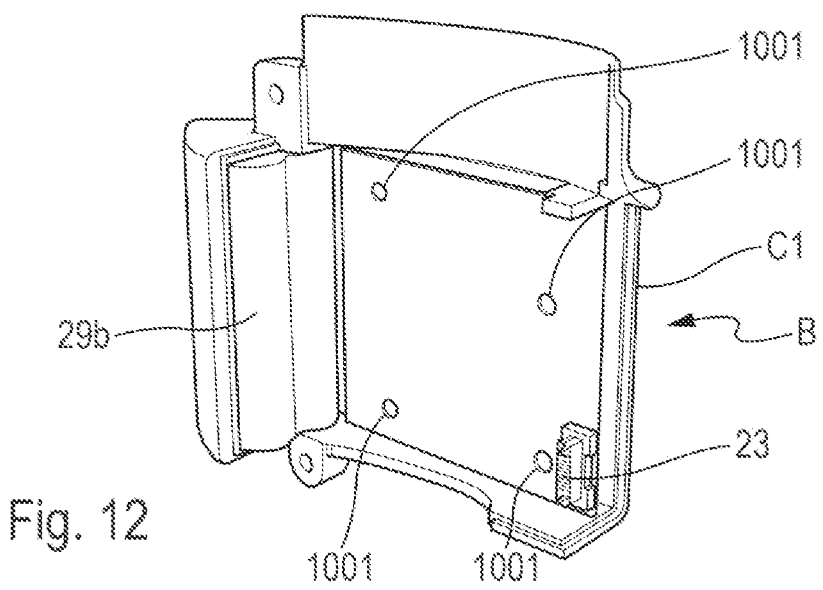
FIG. 12 shows a perspective view of a second half-shell of the processing unit.

Moreover, each of the two parts A, B of the processing unit 8 can comprise a half-shell C1, C2. Each half-shell C1, C2 respectively houses an electronic board 8*a*, 8*b*. Each of the half-shells C1, C2 is configured to be assembled to the other half-shell in order to form a shell 80 configured to contain the processing unit 8. The shell 80 is therefore detachably fixed to one end 10*a* of the sleeve 82. The shell 80 is configured to be detachably fixed on either side of the connecting rod 4, as shown in FIG. 8, FIG. 9, FIG. 11 and FIG. 12. The two half-shells C1, C2 can be assembled using screws 100 (FIG. 8 and FIG. 9). Each of the electronic boards 8*a* and 8*b* can have holes 1002 allowing the screws 100 to join the half-shell C1 and the half-shell C2 (FIG. 8 and FIG. 9).

According to a preferred embodiment, the screws 100 can correspond to captive screws. The captive screws are screwed through tapped holes 1001 in the half-shell C1. The captive screws have an unthreaded shank between a threaded portion and a head of the captive screw. As the diameter of the shank is smaller than that of the threaded part, the captive screw can freely translate as far as the threaded hole 1001 in the half-shell C2 in order to screw them in and assemble the two half-shells C1 and C2 on the sleeve 82. However, the captive screw remains in the tapped hole 1001 of the half-shell C1 without any unscrewing action on the tapped hole 1001 of the half-shell C1. Moreover, the holes 1002 in each of the electronic boards 8*a* and 8*b* have a diameter that is greater than the thread diameter of the screws 100 so that said screws 100 can translate freely as far as the tapped hole 1001 in the half-shell C2. Thus, the use of captive screws prevents them from escaping when assembling or disassembling the half-shells C1 and C2 to or from the sleeve 82.

Each of the two electronic boards 8*a* and 8*b* is housed in a respective half-shell C1, C2. The two electronic boards 8*a* and 8*b* are therefore configured to be disposed on either side of the connecting rod 4 when the shell 80 is fixed to the end 10*a* of the sleeve 82.

The measuring rake 2 can be used as follows.

The sleeve 82 is fixed to a connecting rod 4 of the engine 3. The sleeve 82 is already equipped with the acquisition board 6 of the electronic device 1.

The processing unit 8 is then electrically connected to the acquisition board 6 and is fixed to the end 10*a* of the sleeve 82. In the preferred embodiment, the two parts A and B are assembled at the end 10*a* of the sleeve 82.

When pressure measurements must begin, an operator can act on the remote control device 27 to cause the remote control device to send a remote control signal S to the one or more pressure sensors 7 via the fifth communication module 19 in order to command the one or more pressure sensors 7 to start acquiring at least one pressure measurement.

The one or more pressure sensors 7 of the acquisition board 6 then generate data representing pressure measurements. The first communication module 13 receives this data. This data is then stored in the storage module 14. The data generated by the one or more pressure sensors 7 can be synchronized with each other by the synchronization module 28 before said data is stored in the storage module 14.

When the pressure measurements are considered to have been completed, the operator can act on the remote control device 27 so that the remote control device 27 sends a remote control signal S to the one or more pressure sensors 7 via the fifth communication module 19 in order to command the one or more pressure sensors 7 to stop acquiring the one or more pressure measurements.

In order to retrieve the data, the processing unit 8 is disconnected from the acquisition board 6 and the processing unit 8 is removed from the end 10*a* of the sleeve 82. In the preferred embodiment, the two parts A and B are disassembled from the end 10*a* of the sleeve 82. The operator can then detach the two parts A and B from the connecting rod 4 in order to connect the processing unit 8 to the loading/charging unit 9.

The processing unit 8 is then electrically connected to the loading/charging unit 9 in order to load the pressure measurement data via the second communication module 15 and the third communication module 16. The loading/charging unit 9 can thus transmit the data to a user device 18 via the fourth communication module 17.

In the preferred embodiment, at least part A or B comprises the storage module 14 and the second communication module 15 that is electrically connected to the loading/charging unit 9.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electronic device for a measuring rake, the measuring rake comprising a sleeve configured to be fixed to a connecting rod disposed across a duct of an engine of an aircraft, comprising:

an acquisition board comprising at least one pressure sensor, the acquisition board being configured to at least partly extend over a length of the sleeve, the at least one pressure sensor being able to generate data representing pressure measurements;

a processing unit detachably electrically connected to the acquisition board, the processing unit configured to be detachably fixed to the sleeve;

a loading/charging unit configured to be electrically connected to the processing unit when the processing unit is electrically disconnected from the acquisition board;

the processing unit comprising:

a first communication module configured to receive the data generated by the at least one pressure sensor when the processing unit is electrically connected to the acquisition board;

a storage module configured to store the data received by the first communication module;

a second communication module configured to transmit the data stored in the storage module to the loading/charging unit when the loading/charging unit is electrically connected to the processing unit;

the loading/charging unit comprising:

a third communication module configured to receive the data transmitted by the second communication module when the loading/charging unit is electrically connected to the processing unit;

a fourth communication module configured to transmit the data received by the third communication module to a user device.

2. The device as claimed in claim 1, wherein the processing unit comprises a fifth communication module configured to remotely communicate with a remote control device, the fifth communication module being configured to receive at least one control signal likely to be sent by the remote control device, the one or more control signals representing at least one of at least one command to the at least one pressure sensor to start acquiring at least one pressure measurement or at least one command to the at least one pressure sensor to stop acquiring the one or more pressure measurements.

3. The device as claimed in claim 1, wherein the processing unit further comprises a synchronization module configured to synchronize data generated by the at least one pressure sensor before said data is stored in the storage module.

4. The device as claimed in claim 1, wherein the processing unit comprises at least one power supply module configured to supply power to the processing unit.

5. The device as claimed in claim 1, wherein the processing unit comprises two parts assembled and detachably fixed together at one end of the sleeve on either side of the sleeve, each of the two parts comprising an electronic board, the electronic board of each of the two parts accommodating the first, second, third and fourth communication modules of the processing unit.

6. The device as claimed in claim 2, wherein the processing unit comprises two parts assembled and detachably fixed together at one end of the sleeve on either side of the sleeve, each of the two parts comprising an electronic board, the electronic board of each of the two parts accommodating the first, second, third and fourth communication modules of the processing unit, wherein the processing unit further comprises a synchronization module configured to synchronize data generated by the at least one pressure sensor before said data is stored in the storage module, and wherein the first communication module, the storage module, the second communication module, the fifth communication module and the synchronization module are distributed between the two electronic boards.

7. The device as claimed in claim 6, wherein the power supply module comprises two batteries, each of the two batteries being connected to a respective electronic board, each of the two batteries being configured to supply power to the one or more modules of a respective electronic board.

8. The device as claimed in claim 7, wherein the processing unit comprises a battery management module configured to monitor an electric charge level of each of the batteries and to manage a supply of power to the one or more modules of the electronic boards as a function of the electric charge level of each of the batteries.

9. The device as claimed in claim 5, wherein each of the two parts of the processing unit comprises a half-shell, each half-shell respectively housing an electronic board, each of the two half-shells being configured to be assembled to the other half-shell in order to form a shell.

10. The device as claimed in claim 4, wherein the loading/charging unit is configured to electrically recharge the power supply module when the loading/charging unit is electrically connected to the processing unit.

11. A measuring rake configured to be fixed to a connecting rod disposed across a duct of an aircraft engine, and comprising the electronic device as claimed in claim 1.

12. An aircraft engine, said engine comprising:

a duct, at least one movable reversing door, said movable reversing door comprising at least one connecting rod fixed in an articulated manner between the reversing door and a powerplant, said connecting rod being configured to allow the reversing door to be brought into a retracted position, in which the reversing door is not across the duct, and into a deployed position, in which the reversing door is across the duct, at least one measuring rake as claimed in claim 11, arranged on at least one connecting rod of the engine, the at least one connecting rod each being housed in the housing of at least one sleeve of a measuring rake.

13. An aircraft comprising at least one engine as claimed in claim 12.

* * * * *